(12) United States Patent  (10) Patent No.: US 7,809,468 B2
Yamagishi et al.  (45) Date of Patent: Oct. 5, 2010

(54) TRANSPORTATION STATE NOTIFICATION SYSTEM AND METHOD, PROGRAM, AND INFORMATION STORAGE MEDIUM

(75) Inventors: Takashi Yamagishi, Sakata (JP); Kazufumi Kato, Sakata (JP); Takuma Miura, Suwa (JP); Katsutoshi Ozawa, Ohtsu (JP)

(73) Assignees: Seiko Epson Corporation (JP); OMRON Corporation (JP)

( * ) Notice: Subject to any disclaimer, the term of this patent is extended or adjusted under 35 U.S.C. 154(b) by 490 days.

(21) Appl. No.: 11/895,742

(22) Filed: Aug. 27, 2007

(65) Prior Publication Data
US 2008/0021594 A1   Jan. 24, 2008

Related U.S. Application Data

(62) Division of application No. 11/040,998, filed on Jan. 21, 2005, now Pat. No. 7,277,774.

(30) Foreign Application Priority Data
Jan. 23, 2004 (JP) .............................. 2004-015151

(51) Int. Cl.
G06F 7/00 (2006.01)
(52) U.S. Cl. ................... 700/229; 700/213; 700/228
(58) Field of Classification Search ................. 700/229, 700/213, 214, 218, 228, 112; 414/935, 940
See application file for complete search history.

(56) References Cited

U.S. PATENT DOCUMENTS

| | | | |
|---|---|---|---|
| 5,838,566 A | 11/1998 | Conboy et al. | |
| 6,050,768 A | 4/2000 | Iwasaki et al. | |
| 6,122,566 A | 9/2000 | Nguyen et al. | |
| 6,128,588 A | 10/2000 | Chacon | |
| 6,466,835 B1 | 10/2002 | Ishizawa et al. | |
| 6,733,243 B2 | 5/2004 | Ogata et al. | |
| 6,821,082 B2 * | 11/2004 | McGowan | 414/805 |
| 6,887,358 B2 | 5/2005 | Elger | |
| 6,931,303 B2 | 8/2005 | Chang et al. | |
| 6,975,921 B2 | 12/2005 | Verhaar | |
| 6,985,794 B1 | 1/2006 | Conboy et al. | |
| 7,076,326 B2 * | 7/2006 | Wu et al. | 700/213 |
| 7,177,716 B2 | 2/2007 | Duffin et al. | |
| 2001/0012970 A1 * | 8/2001 | Nakashima | 700/115 |

(Continued)

FOREIGN PATENT DOCUMENTS

JP   2001-297140   10/2001

*Primary Examiner*—Gene Crawford
*Assistant Examiner*—Ramya Prakasam
(74) *Attorney, Agent, or Firm*—Harness, Dickey & Pierce, P.L.C.

(57) ABSTRACT

A server includes a communication section which receives event information from an event detection device which detects a plurality of types of events occurring in a plurality of temporary storage devices provided at different locations, and transmits transportation load display information to a PC, a storage section which stores lot state data indicating states of lots and storage state data indicating states of the temporary storage devices, an update section which updates the lot state data and the storage state data based on the event information, and an information generation section which generates transportation load display information for notifying a lot transportation state to the user based on the lot state data and the storage state data.

3 Claims, 9 Drawing Sheets

U.S. PATENT DOCUMENTS

2003/0233161 A1 12/2003 Cheng et al.
2004/0049398 A1 3/2004 Gartland et al.
2006/0190118 A1 8/2006 Teferra et al.

* cited by examiner

FIG. 4

| LOT ID | STEP TYPE | STATE | CURRENT POSITION | LATEST EVENT | PREVIOUS EVENT | EVENT OCCURRENCE TIME | ... |
|---|---|---|---|---|---|---|---|
| L001 | R001 | UNDER TRANSPORTATION | ST1 | E4 | E3 | 2003/10/10 10:10:10 | ... |
| L002 | R003 | AWAITING TRANSPORTATION | ST3 | E2 | E1 | 2003/10/10 10:10:10 | ... |
| L003 | R004 | UNDER ACCEPTANCE | ST2 | E3 | E2 | 2003/10/10 10:10:10 | ... |
| ⋮ | ⋮ | ⋮ | ⋮ | ⋮ | ⋮ | ⋮ | ⋮ |

FIG. 5

| STORAGE DEVICE ID | NUMBER OF STORED LOTS | NUMBER OF STORABLE LOTS | VIRTUAL NUMBER OF STORABLE LOTS | PROCESSING | ... |
|---|---|---|---|---|---|
| ST1 | 5 | 9 | 7 | CLEANING | ... |
| ST2 | 2 | 4 | 3 | PHOTO PROCESS | ... |
| ⋮ | ⋮ | ⋮ | ⋮ | ⋮ | ⋮ |

FIG. 6

| STEP TYPE | STEP ORDER | ... |
|---|---|---|
| R001 | CLEANING AND PHOTO PROCESS | ... |
| ⋮ | ⋮ | ⋮ |

| EVENT OCCURRENCE TIME | LOT ID | CURRENT POSITION | LATEST EVENT | ... |
|---|---|---|---|---|
| 2003/10/10 10:10:10 | L001 | ST1 | E4 | ... |
| 2003/10/10 10:10:10 | L002 | ST3 | E2 | ... |
| 2003/10/10 10:10:10 | L003 | ST2 | E3 | ... |
| ⋮ | ⋮ | ⋮ | ⋮ | ⋮ |

148

TRANSPORTATION STATE NOTIFICATION SYSTEM AND METHOD, PROGRAM, AND INFORMATION STORAGE MEDIUM

CROSS REFERENCE TO RELATED APPLICATIONS

This application is a divisional patent application of U.S. Ser. No. 11/040,998 filed Jan. 21, 2005, claiming priority to Japanese Patent Application No. 2004-015151, filed on Jan. 23, 2004, all of which are hereby incorporated by reference.

BACKGROUND OF THE INVENTION

The present invention relates to a transportation state notification system and method, a program, and an information storage medium.

In order to improve efficiency of physical distribution, a management system must monitor in real time a transportation state, a load state, and the like of distribution equipment including an automatic warehouse which automatically stores articles and loading equipment such as an automatic transportation vehicle which transports articles between automatic warehouses.

In order to enable real-time monitoring, the management system must acquire data such as the operation state from each piece of equipment through a network and analyze the data.

Japanese Patent Application Laid-open No. 2001-297140 discloses a management system which connects a plurality of distribution systems with a network server through a network and manages stock and delivery/dispatching in each distribution system, distribution progress state, occurrence of errors, and the like.

Since a conventional management system merely monitors the transportation state and the operation state, a conventional management system cannot determine the transportation load state.

A conventional management system merely depicts the transportation state at one time. Therefore, when a lot is retained in an automatic warehouse, the user cannot determine the reason for retainment of the lot, whereby it is difficult for the user to deal with the situation.

A conventional management system cannot predict the transportation load. Therefore, when a change in a production line occurs due to a change in the production target, it is difficult for a conventional management system to predict the location and the degree of the transportation load.

BRIEF SUMMARY OF THE INVENTION

According to the first aspect of the present invention, there is provided a transportation state notification system which notifies transportation states of lots transported between a plurality of temporary storage devices provided at different locations, the transportation state notification system comprising:

event detection means for detecting a plurality of types of events relating to lot transportation occurring in the temporary storage devices;

storage means for storing lot state data indicating a transportation state of each of the lots;

update means for updating the lot state data based on the events detected by the event detection means; and state notification means for notifying an image showing a transportation load state of the lots to a user based on the lot state data, wherein the lot state data includes data indicating an event transition of each of the lots, and wherein the state notification means determines whether the lots are in a state of either "under transportation" or "awaiting transportation" based on the data indicating the event transition, and displays an image showing a state of a target lot at a predetermined time as the image showing the transportation load state.

According to the second aspect of the present invention, there is provided a program for notifying transportation states of lots transported between a plurality of temporary storage devices provided at different locations, the program for causing a computer to function as:

event detection means for detecting a plurality of types of events relating to lot transportation occurring in the temporary storage devices;

storage means for storing lot state data indicating a transportation state of each of the lots;

update means for updating the lot state data based on the events detected by the event detection means; and state notification means for notifying an image showing a transportation load state of the lots to a user based on the lot state data, wherein the lot state data includes data indicating an event transition of each of the lots, and wherein the state notification means determines whether the lots are in a state of either "under transportation" or "awaiting transportation" based on the data indicating the event transition, and displays an image showing a state of a target lot at a predetermined time as the image showing the transportation load state.

According to the third aspect of the present invention, there is provided an information storage medium storing the above program.

According to the fourth aspect of the present invention, there is provided a transportation state notification method, comprising:

detecting a plurality of types of events relating to lot transportation in a plurality of temporary storage devices which are provided at different locations, to which lots are transported, and in which the lots are stored;

updating lot state data including data indicating an event transition of each of the lots based on the detected events; and determining whether the lots are in a state of "under transportation" or "awaiting transportation" based on the data indicating the event transition, and displaying an image showing a state of a target lot at a predetermined time as an image showing a transportation load state.

BRIEF DESCRIPTION OF THE SEVERAL VIEWS OF THE DRAWING

FIG. 4 is a schematic diagram showing a data structure of lot state data according to an example of an embodiment of the present invention.

FIG. 5 is a schematic diagram showing a data structure of storage state data according to an example of an embodiment of the present invention.

FIG. 6 is a schematic diagram showing a data structure of step data according to an example of an embodiment of the present invention.

FIG. 7 is a schematic diagram showing a data structure of event data according to an example of an embodiment of the present invention.

DETAILED DESCRIPTION OF THE EMBODIMENT

Figure 1:
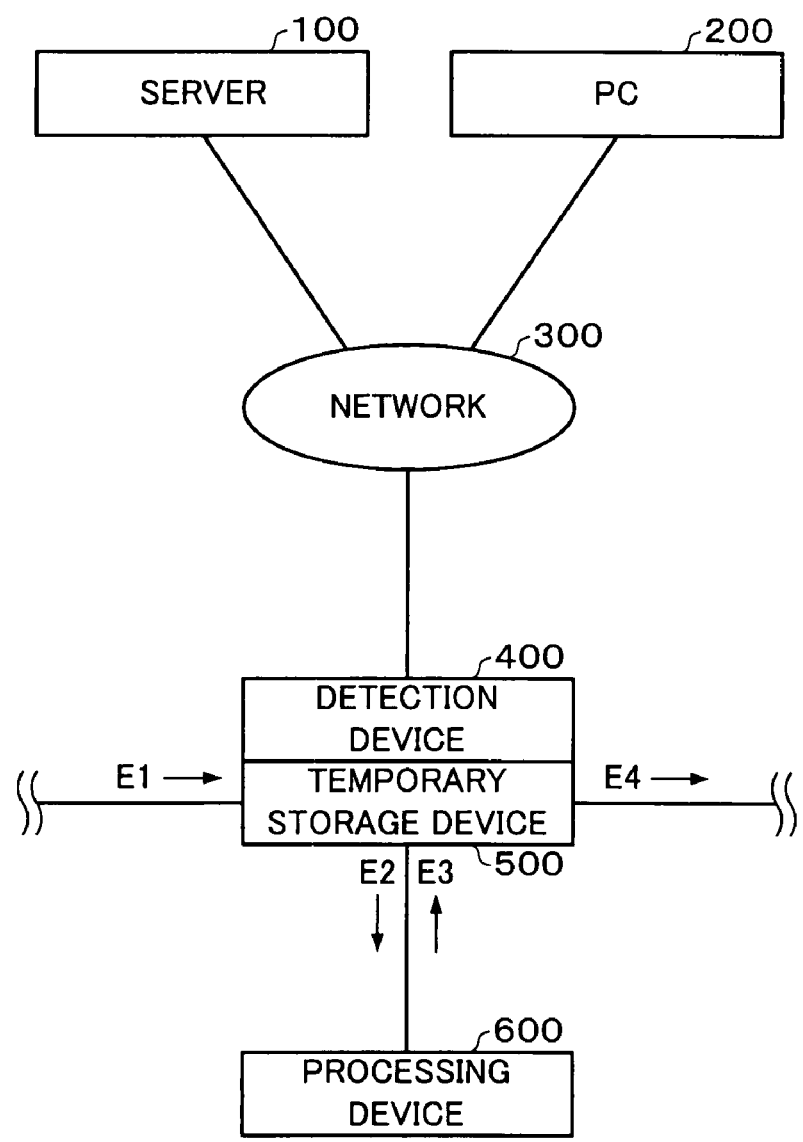
FIG. 1 is a schematic diagram of an entire system according to an example of an embodiment of the present invention.

The present invention has been achieved in view of the above-described problems, and may provide a transportation state notification system and method, a program, and an information storage medium capable of informing the user of a transportation load state.

According to one embodiment of the present invention, there is provided a transportation state notification system which notifies transportation states of lots transported between a plurality of temporary storage devices provided at different locations, the transportation state notification system comprising:

event detection means for detecting a plurality of types of events relating to lot transportation occurring in the temporary storage devices;

storage means for storing lot state data indicating a transportation state of each of the lots;

update means for updating the lot state data based on the events detected by the event detection means; and state notification means for notifying an image showing a transportation load state of the lots to a user based on the lot state data, wherein the lot state data includes data indicating an event transition of each of the lots, and wherein the state notification means determines whether the lots are in a state of either "under transportation" or "awaiting transportation" based on the data indicating the event transition, and displays an image showing a state of a target lot at a predetermined time as the image showing the transportation load state.

According to one embodiment of the present invention, there is provided a program for notifying transportation states of lots transported between a plurality of temporary storage devices provided at different locations, the program for causing a computer to function as:

event detection means for detecting a plurality of types of events relating to lot transportation occurring in the temporary storage devices;

storage means for storing lot state data indicating a transportation state of each of the lots;

update means for updating the lot state data based on the events detected by the event detection means; and state notification means for notifying an image showing a transportation load state of the lots to a user based on the lot state data, wherein the lot state data includes data indicating an event transition of each of the lots, and wherein the state notification means determines whether the lots are in a state of either "under transportation" or "awaiting transportation" based on the data indicating the event transition, and displays an image showing a state of a target lot at a predetermined time as the image showing the transportation load state.

According to one embodiment of the present invention, there is provided an information storage medium storing the above program.

According to one embodiment of the present invention, there is provided a transportation state notification method, comprising:

detecting a plurality of types of events relating to lot transportation in a plurality of temporary storage devices which are provided at different locations, to which lots are transported, and in which the lots are stored;

updating lot state data including data indicating an event transition of each of the lots based on the detected events; and determining whether the lots are in a state of "under transportation" or "awaiting transportation" based on the data indicating the event transition, and displaying an image showing a state of a target lot at a predetermined time as an image showing a transportation load state.

The transportation state notification system and the like according to the present embodiment can detect the events occurring in the temporary storage devices and determine the lot transportation state based on the data indicating the event transition. This enables the transportation state notification system and the like to inform the user of the actual transportation load state.

In the transportation state notification system, the program, and the information storage medium, the plurality of types of events may include an inter-storage-device transportation event indicating that a lot has been sent from one predetermined temporary storage device to another temporary storage device, a lot arrival event indicating that a lot has arrived at one predetermined temporary storage device from another temporary storage device, a processing device transportation event indicating that a lot has been sent from the temporary storage devices to a processing device of the lots, and a processing completion event indicating that a lot has arrived at the temporary storage device from the processing device, the storage means may store storage state data indicating a lot storage state in the temporary storage devices, the update means may update the storage state data based on the events detected by the event detection means, and the state notification means may determine whether the lots are in a state of "under acceptance" indicating that a lot is waiting for the temporary storage devices at a transportation destination to become free, the "under transportation", or the "awaiting transportation" based on the data indicating the event transition and the storage state data, and may display the image showing the transportation load state.

In the transportation state notification method, the plurality of types of events may include an inter-storage-device transportation event indicating that a lot has been sent from one predetermined temporary storage device to another temporary storage device, a lot arrival event indicating that a lot has arrived at one predetermined temporary storage device from another temporary storage device, a processing device transportation event indicating that a lot has been sent from the temporary storage devices to a processing device of the lots, and a processing completion event indicating that a lot has arrived at the temporary storage device from the processing device, and the method may comprise:

updating storage state data indicating a lot storage state in the temporary storage devices based on the detected events; and determining whether the lots are in a state of "under acceptance" indicating that a lot is waiting for the temporary storage devices at a transportation destination to become free, the "under transportation", or the "awaiting transportation" based on the data indicating the event transition and the storage state data, and displaying the image showing the transportation load state.

With this configuration, the transportation state notification system and the like can inform the user of the transportation load state in more detail by displaying an image showing the transportation load state based on the storage state data. In more detail, when a lot is retained in the temporary storage device, the transportation state notification system and the like can inform the user whether the lot is waiting for the temporary storage device at the transportation destination to become free or merely waits for transportation. This enables the user to more appropriately deal with the situation corresponding to the transportation load state.

In the transportation state notification system, the program, and the information storage medium, the storage means may store step data indicating a processing step performed for each of the lots, and the state notification means may predict and notify the transportation load state based on the step data.

In the transportation state notification method may comprise:

predicting and notifying the transportation load state based on step data indicating a processing step performed for each of the lots.

With this configuration, since the transportation state notification system and the like can determine the state of a lot in the state "awaiting transportation" or the like and the processing step of the lot, the transportation state notification system and the like can inform the user of the transportation load state even if the processing step is changed by predicting the transportation load state, for example.

In the transportation state notification system, the program, and the information storage medium, the state notification means may calculate a transportation load index based on a ratio of a total number of the lots to a number of lots in a state of the "under transportation", and the state notification means may display an image showing the transportation load index as the image showing the transportation load state.

The transportation state notification method may comprise:

calculating a transportation load index based on a ratio of a total number of the lots to a number of lots in a state of the "under transportation", and displaying an image showing the transportation load index as the image showing the transportation load state.

With this configuration, since the transportation state notification system and the like can display an image showing the transportation load index, changes in transportation load index in time zone units can be displayed, or an alert can be displayed when the transportation load index has exceeded a predetermined value, for example.

The present invention is described below with reference to the drawings taking the case of applying the present invention to a transportation state notification system which notifies a lot transportation state in a semiconductor manufacturing factory as an example. Note that the embodiments described below do not limit the scope of the invention defined by the claims laid out herein. In addition, not all of the elements of the embodiments described below should be taken as essential requirements of the present invention.

Description of Entire System

FIG. 1 is a schematic diagram of an entire system according to an example of an embodiment of the present invention.

This system includes a temporary storage device 500 which temporarily stores a lot, a processing device 600 which receives a lot from the temporary storage device 500 and performs predetermined processing for a lot, and a detection device 400 which detects four types of events E1 to E4 relating to lot transportation occurring in the temporary storage device 500.

The term "a lot" used herein refers to one type of a processing unit. In a semiconductor manufacturing factory, the same kind of wafers are collectively handled as a lot. The event E1 is a lot arrival event indicating that a lot has arrived at the temporary storage device 500 from another temporary storage device. The event E2 is a processing device transportation event indicating that a lot has been sent from the temporary storage device 500 to the processing device 600. The event E3 is a processing completion event indicating that a lot has arrived at the temporary storage device 500 from the processing device 600. The event E4 is an inter-storage-device transportation event indicating that a lot has been sent from the temporary storage device 500 to another temporary storage device.

This system includes a server 100 which receives information on an event detected by the detection device 400 through a network 300 and generates transportation load display information, and a PC 200 which receives the transportation load display information from the server 100 and displays a transportation state.

In the actual situation, pluralities of detection devices 400, temporary storage devices 500, and processing devices 600 are provided. Suppose that an automatic transportation vehicle transports a lot between the temporary storage devices 500, and a transportation crane transports a lot between the temporary storage device 500 and the processing device 600. In this case, the detection device 400 may detect the events E1 to E4 by detecting the operation of the automatic transportation vehicle or the transportation crane, for example. In the present embodiment, the server 100, the PC 200, and the detection device 400 function as a transportation state notification system.

An image of a transportation load state displayed by the PC 200 is described below.

Figure 2:
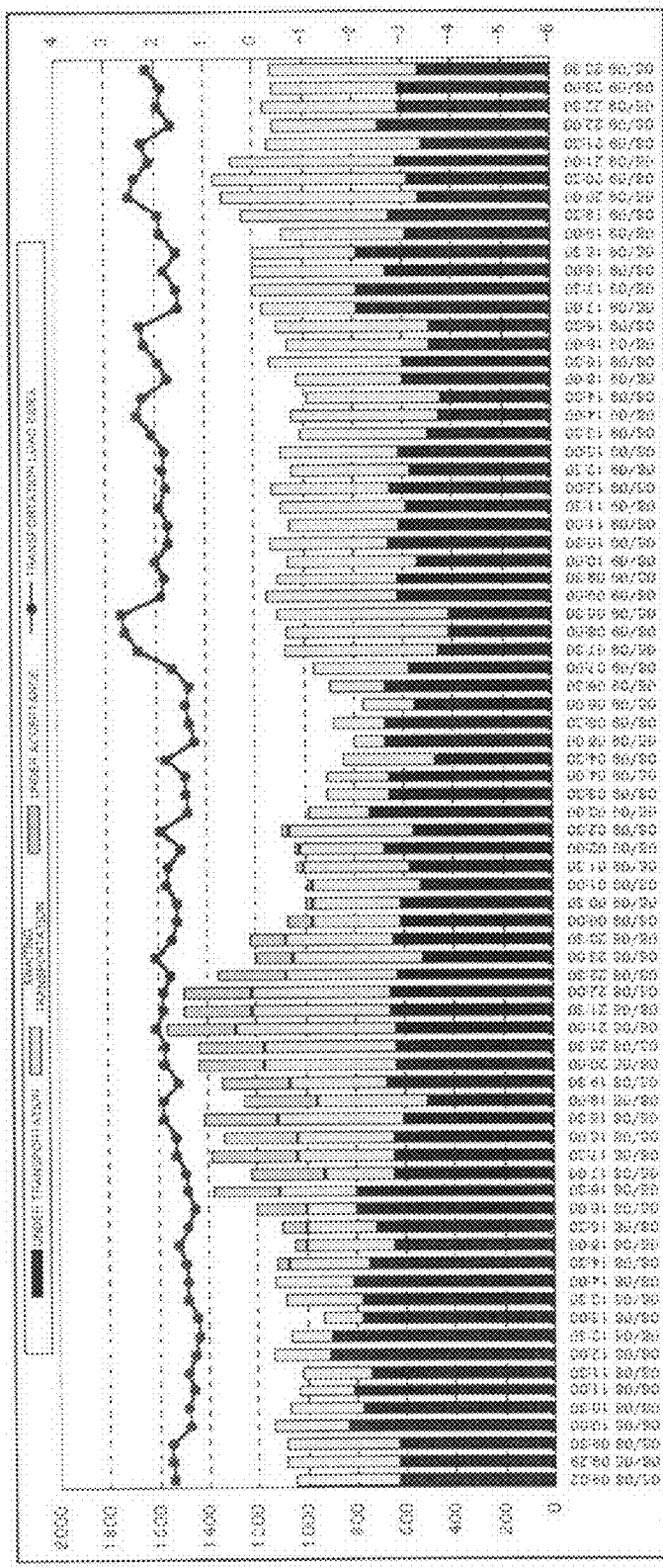
FIG. 2 is a diagram of an image showing a transportation load state according to an example of an embodiment of the present invention.

FIG. 2 is a diagram of an image showing a transportation load state according to an example of an embodiment of the present invention.

In the image shown in FIG. 2, the number of lots classified into states of "under transportation", "awaiting transportation", and "under acceptance" throughout the entire factory are displayed in time series in units of 30 minutes. The state "under acceptance" indicates a state in which a lot is waiting for the temporary storage device at the transportation destination to become free. In this image, changes in transportation load index are displayed in time series in units of 30 minutes. The unit in time series in FIG. 2 is 30 minutes. However, the unit may be set to an arbitrary time unit by the setting of the server.

According to the transportation state notification system in the present embodiment, the user can be informed of the actual transportation state and transportation load.

Functional blocks of the server 100 for implementing the above-described function are described below.

Figure 3:
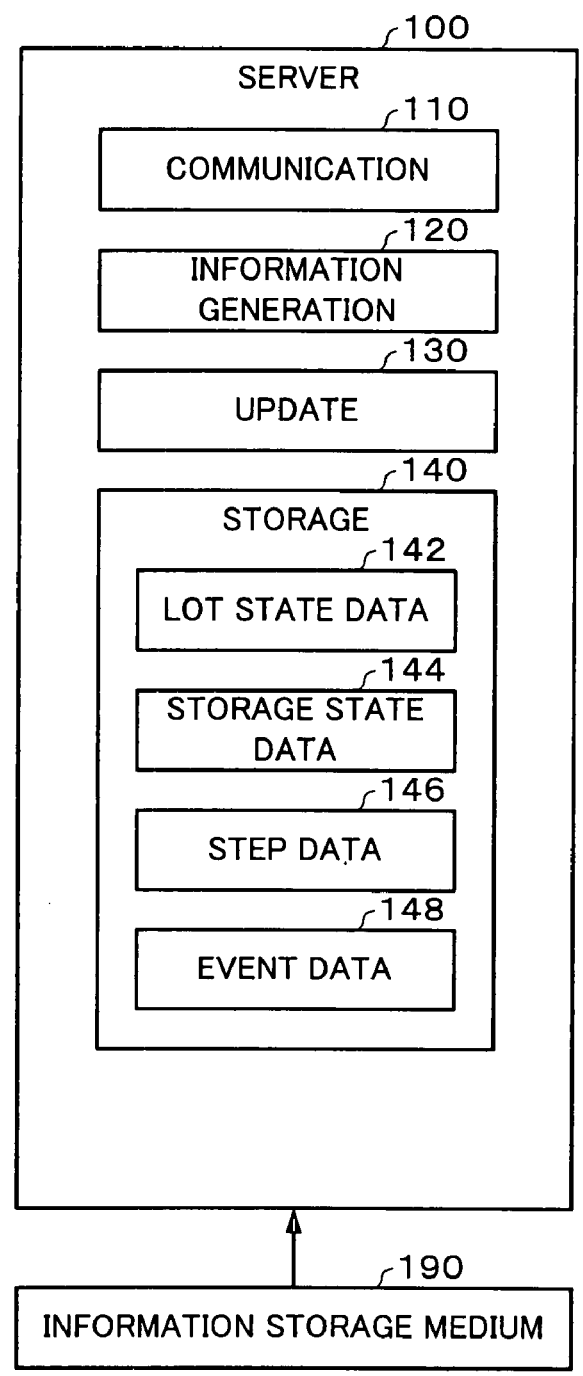
FIG. 3 is a functional block diagram of a server according to an example of an embodiment of the present invention.

FIG. 3 is a functional block diagram of the server 100 according to an example of an embodiment of the present invention.

The server 100 includes a communication section 110 which transmits and receives information to and from the detection device 400 and the PC 200, an information generation section 120 which generates transportation load display information or the like, a storage section 140 which stores various types of data, and an update section 130 which updates data in the storage section 140.

The storage section 140 stores lot state data 142 indicating the lot transportation state or the like, storage state data 144 indicating the lot storage state in the temporary storage device 500, step data 146 indicating the order of lot processing steps, and event data 148 indicating an event detected by the detection device 400.

The update section 130 updates the lot state data 142 and the storage state data 144 based on the event data 148.

The information generation section 120 functions as a part of state notification means for informing the user of the lot transportation state using an image (may be an image and voice) based on the lot state data 142 and the storage state data 144. A display of the PC 200 also functions as a part of the state notification means.

The data structure of the lot state data 142, the storage state data 144, the step data 146, and the event data 148 is described below.

FIG. 4 is a schematic diagram showing the data structure of the lot state data 142 according to an example of an embodiment of the present invention.

An event of each lot detected by the detection device 400 is sequentially stored as the lot state data 142.

As examples of items of the lot state data 142, "lot ID" for identifying a lot, "step type" indicating the type of a step performed for a lot, "state" indicating the lot transportation state, "current position" indicating the current position of a lot, "latest event" indicating the latest event which has occurred, "previous event" indicating the event which has occurred immediately before the latest event, "event occurrence time" indicating the occurrence time of the latest event, and the like can be given. As examples of "state", "under transportation", "awaiting transportation", "under acceptance", and the like can be given.

In the example shown in FIG. 4, a lot with "lot ID" of "L001" has "step type" of "R001", "state" of "under transportation", "current position" of "ST1" which is one of the temporary storage devices 500, "latest event" of "E4", "previous event" of "E3", and "event occurrence time" of "2003/10/10 10:10:10".

As described above, the lot state data 142 includes data ("latest event" and "previous event") indicating an event transition of each lot. The "state" of the lot state data 142 is determined corresponding to the event transition.

The server 100 can determine the transportation state of each lot or the like by using the lot state data 142.

The data structure of the storage state data 144 is described below.

FIG. 5 is a schematic diagram showing the data structure of the storage state data 144 according to an example of an embodiment of the present invention.

The storage state data 144 is data indicating the lot storage state in a plurality of temporary storage devices 500.

As examples of items of the storage state data 144, "storage device ID" for identifying the temporary storage device 500, "number of stored lots" indicating the number of lots stored in the temporary storage device 500, "number of storable lots" indicating the maximum number of lots which can be stored in the temporary storage device 500, "virtual number of storable lots" indicating an alert value of the number of lots in the temporary storage device 500, "processing" indicating processing performed by the processing device 600 which cooperates with the temporary storage device 500, and the like can be given.

In the example shown in FIG. 5, the temporary storage device 500 with "storage device ID" of "ST1" has "number of stored lots" of "5", "number of storable lots" of "9", "virtual number of storable lots" of "7", and "processing" of "cleaning".

The server 100 can determine the lot storage state or the like in the temporary storage device 500 by using the storage state data 144.

The data structure of the step data 146 is described below.

FIG. 6 is a schematic diagram showing the data structure of the step data 146 according to an example of an embodiment of the present invention.

The step data 146 is data indicating a processing step performed for each lot.

As examples of items of the step data 146, "step type" indicating the type of a processing step performed for a lot, "step order" indicating the order of processing steps, and the like can be given.

In the example shown in FIG. 6, when "step type" is "R001", a lot is subjected to cleaning and a photo process.

The server 100 can determine the processing order of each lot by using the step data 146, whereby the transportation load can be predicted.

The data structure of the event data 148 is described below.

FIG. 7 is a schematic diagram showing the data structure of the event data 148 according to an example of an embodiment of the present invention.

Information on an event detected by the detection device 400 is sequentially stored as the event data 148.

As examples of items of the event data 148, "event occurrence time", "lot ID", "current position", "latest event", and the like can be given.

In the example shown in FIG. 7, an event of "E4" occurred for a lot of "L001" at "ST1" at "2003/10/10 10:10:10".

The server 100 can determine all events detected by the detection device 400 by using the event data 148.

Functional blocks of the detection device 400 are described below.

Figure 8:
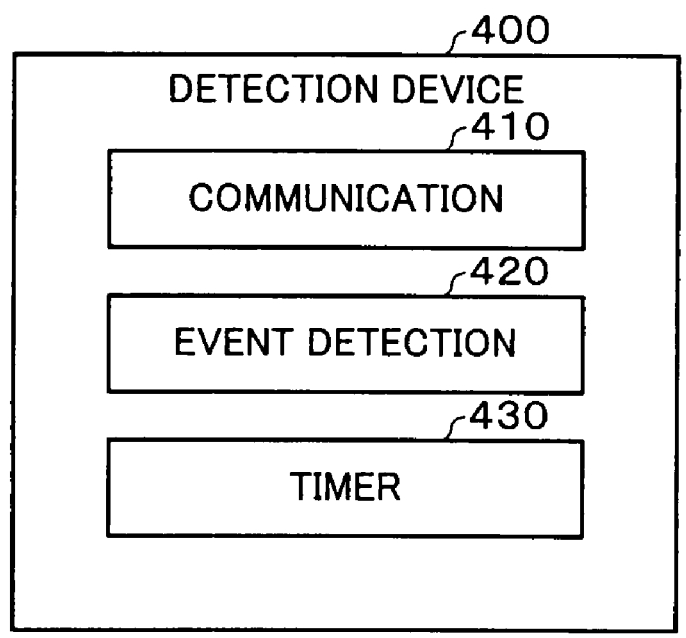
FIG. 8 is a functional block diagram of a detection device according to an example of an embodiment of the present invention.

FIG. 8 is a functional block diagram of the detection device 400 according to an example of an embodiment of the present invention.

The detection device 400 includes an event detection section 420 which detects the events E1 to E4 occurring in the temporary storage device 500, a communication section 410 which transmits event information indicating the content and time of the detected event to the server 100, and a timer section 430.

Description of Hardware

As hardware for implementing the function of each section of the server 100 and the detection device 400 on a computer, the following hardware may be applied, for example.

For example, the function of each section may be implemented on a computer by using a LAN board and the like as the communication sections 110 and 410, a CPU and the like as the information generation section 120, the update section 130, and the event detection section 420, an HDD and the like as the storage section 140, and a system timer and the like as the timer section 430.

Each section may be implemented on a computer by hardware using a circuit, or may be implemented on a computer by software using a program.

The function of the information generation section 120 or the like may be implemented on a computer by having a computer read a program for causing a computer to operate as the information generation section 120 or the like from an information storage medium 190 which stores the program.

As the information storage medium 190, a CD-ROM, DVD-ROM, ROM, RAM, HDD, or the like may be applied. The program reading method may be either a contact method or a non-contact method.

Each of the above-described functions may be implemented on a computer by downloading a program for realizing each of the above-described functions or the like from a host device or the like through a transmission line instead of using the information storage medium 190.

Description of Flow of Processing

A procedure of transportation load display processing using each section is described below.

Figure 9:
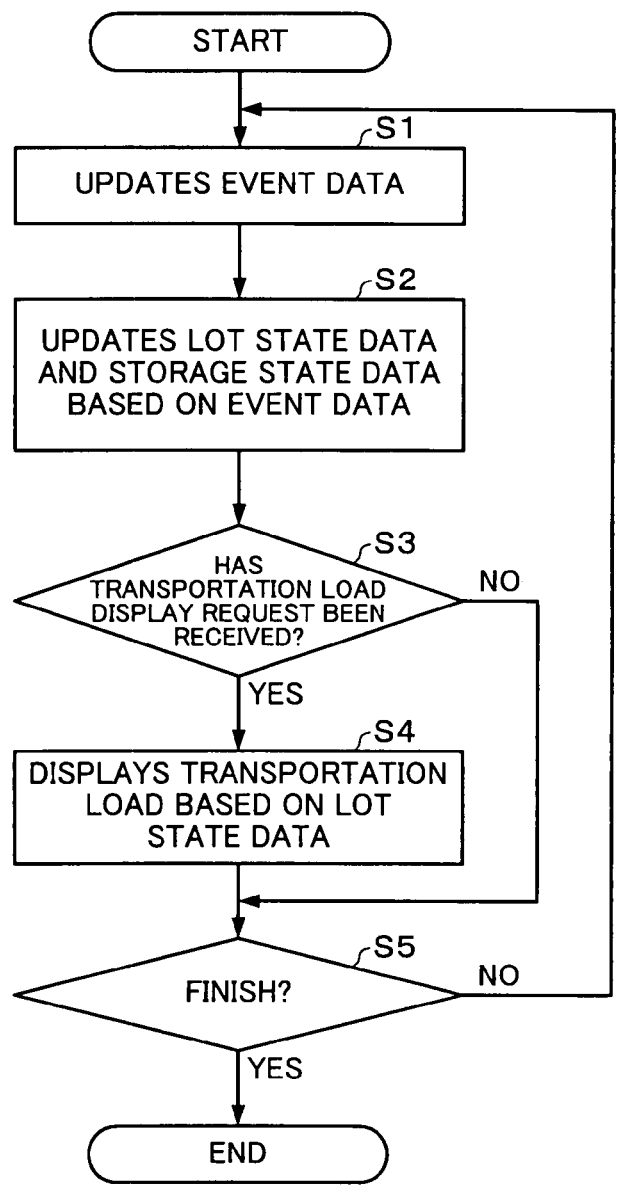
FIG. 9 is a flowchart showing processing to display transportation load according to an example of an embodiment of the present invention.

FIG. 9 is a flowchart showing processing to display transportation load according to an example of an embodiment of the present invention.

The event detection section 420 of the detection device 400 detects the events E1 to E4 based on the operation of the lot automatic transportation vehicle, the operation of the lot transportation crane, or the like. The event detection section 420 generates event information including lot identification information, event type information indicating the event which has occurred, identification information of the temporary storage device 500 as the event detection target, and time information indicated by the timer section 430. The communication section 410 transmits the event information to the server 100.

The communication section 110 receives the event information, and the update section 130 updates the event data 148 based on the event information (step S1). In more detail, the update section 130 inputs "lot ID" based on the lot identification information included in the event information, inputs "latest event" based on the event type information included in the event information, inputs "current position" based on the identification information of the temporary storage device 500 included in the event information, and inputs "event occurrence time" based on the time information included in the event information. The information on the event detected by the detection device 400 is sequentially input as the event data 148 in this manner.

The update section 130 updates the lot state data 142 and the storage state data 144 based on the event data 148 at a predetermined timing (at intervals of predetermined periods, at a predetermined time, or upon update of the event data 148, for example) (step S2).

In more detail, when a new event has occurred for a target lot, the update section 130 copies "latest event" of the lot in the lot state data 142 and stores it as "previous event", copies "current position" of the event data 148 and stores it as "current position" of the lot state data 142, copies "latest event" of the event data 148 and stores it as "latest event" in the lot state data 142, and copies "event occurrence time" of the event data 148 and stores it as "event occurrence time" of the lot state data 142.

The update section 130 determines the transportation state based on "previous event" and "latest event" of the lot state data 142, and updates "state" of the event data 148. For example, when "previous event" is "E3" and "latest event" is "E4", "state" is "under transportation". When "previous event" is "E1" and "latest event" is "E2", "state" is "awaiting transportation". When "previous event" is "E2" and "latest event" is "E3", "state" is "under acceptance".

When the update section 130 has determined that the event E1 has occurred for a target lot based on the event data 148, specifically, when a new lot has been delivered to the temporary storage device 500, the update section 130 increments "number of stored lots" of the storage state data 144 by one. When the update section 130 has determined that the event E4 has occurred for a target lot based on the event data 148, specifically, when a lot has left the temporary storage device 500, the update section 130 decrements "number of stored lots" of the storage state data 144 by one.

As described above, since the storage state data 144 is maintained in the latest state, a lot can be prevented from being delivered to the temporary storage device 500 when "number of stored lots" of the storage state data 144 has become equal to "virtual number of storable lots" by causing the information generation section 120 to generate control information for preventing delivery to the temporary storage device 500 and the communication section 110 to transmit the control information to the transportation vehicle or the like. However, even when "number of stored lots" has become equal to "virtual number of storable lots", an express lot is excluded from the limitation target of delivery to the temporary storage device 500 by providing the difference between "virtual number of storable lots" and "number of storable lots".

A case where the user performs the transportation load display is described below.

The PC 200 generates transportation load display request information corresponding to the operation performed by the user, and transmits the transportation load display request information to the server 100.

The information generation section 120 determines whether or not the transportation load display request information has been received by the communication section 110 (step S3).

When the transportation load display request has occurred, the information generation section 120 generates transportation load display information based on the lot state data 142, and the communication section 110 transmits the transportation load display information to the PC 200. The PC 200 displays an image showing the transportation load state as shown in FIG. 2 based on the transportation load display information (step S4).

In more detail, the information generation section 120 calculates the number of lots for each state at a predetermined time by referring to "state" and "event occurrence time" of the lot state data 142. The information generation section 120 calculates the transportation load index based on the total number of lots and the number of lots in the state "under transportation". As the transportation load index, the ratio of the total number of lots to the number of lots in the state "under transportation" or the like may be used.

The information generation section 120 can generate the transportation load display information for displaying an image showing the transportation load state as shown in FIG. 2 by performing such a calculation.

The server 100, the PC 200, and the detection device 400 perform the processing in the steps S1 to S4 repeatedly until transportation of a lot is completed (step S5).

As described above, according to the present embodiment, the server 100 can detect a plurality of types of events relating to lot transportation in the temporary storage device 500, and can determine the lot transportation state based on the lot state data 142 indicating the event transition. This enables the server 100 to inform the user of the actual transportation load state.

For example, since a conventional system determines the transportation state merely based on the event at one time, a conventional system cannot determine whether the event E4 shown in FIG. 1 has transitioned from the event E1 or transitioned from the event E3.

On the other hand, since the server 100 in the present embodiment determines the transportation state based on the event transition, the server 100 can determine the transportation state in more detail, whereby the user can be informed of the transportation load state more appropriately.

According to the present embodiment, the server 100 can inform the user of the transportation load state in more detail by displaying an image showing the transportation load state based on the storage state data 144. In more detail, when a lot is retained in the temporary storage device 500, the server 100 can inform the user whether the lot is waiting for the temporary storage device 500 at the transportation destination to become free or merely waits for transportation. This enables the user to more appropriately deal with the situation corresponding to the transportation load state.

According to the present embodiment, since the server 100 can determine the lot state such as "awaiting transportation" and the processing step of the lot by using the step data 146, the server 100 can inform the user of the transportation load state even if the processing step is changed by predicting the transportation load state, for example.

According to the present embodiment, since an image showing the transportation load index as shown in FIG. 2 can be displayed, the changes in the transportation load index in time zone units can be displayed, or an alert can be displayed when the transportation load index has exceeded a predetermined value, for example.

Modification

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

For example, the information generation section 120 may generate the transportation load display information for displaying the transportation load state in processing units or in device units instead of the entire factory. The information generation section 120 may generate image information for displaying the operation rate of the automatic transportation vehicle or the like, the transportation time, the number of transportations, the state of a transportation target lot (mass production, prototype, or the like), the stock state of the temporary storage devices 500, or the like in addition to the transportation load.

When the transportation load index indicating the transportation load has exceeded a predetermined value, the information generation section 120 may generate control information for issuing an alert or compulsorily stopping the device.

The application of the present invention is not limited to a semiconductor manufacturing factory. The present invention may be applied to various transportation systems. The present invention is also effective in the case of using transportation means such as a belt conveyor in addition to the above-described automatic transportation vehicle or transportation crane.

The functions of the server 100, the PC 200, and the detection device 400 may be implemented on one device, or may be distributed over two or more devices.

What is claimed is:

1. A transportation state notification method, comprising:
    detecting a plurality of types of events relating to lot transportation in a plurality of temporary storage devices which are provided at different locations, to which lots are transported, and in which the lots are stored;
    updating lot state data including data indicating an event transition of each of the lots based on the detected events;
    determining whether the lots are in an under transportation state or an awaiting transportation state based on the data indicating the event transition, and displaying an image showing a state of a target lot at a predetermined time as an image showing a transportation load state;
    calculating a transportation load index based on a ratio of a total number of the lots to a number of lots in the under transportation state; and
    displaying an image showing the transportation load index as the image showing the transportation load state.

2. The transportation state notification method as defined in claim 1, comprising:
    predicting and notifying the transportation load state based on step data indicating a processing step performed for each of the lots.

3. A transportation state notification method, comprising:
    detecting a plurality of types of events relating to a lot transportation in a plurality of temporary storage devices which are provided at different locations, to which lots are transported, and in which the lots are stored;
    updating lot state data including data indicating an event transition of each of the lots based on the detected events;
    determining whether the lots are in an under transportation state or an awaiting transportation state based on the data indicating the event transition, and displaying an image showing a state of a target lot at a predetermined time as an image showing a transportation load state,
    wherein the plurality of types of events include an inter-storage-device transportation event indicating that a lot has been sent from one predetermined temporary storage device to another temporary storage device, a lot arrival event indicating that a lot has arrived at one predetermined temporary storage device from another temporary storage device, a processing device transportation event indicating that a lot has been sent from the temporary storage devices to a processing device of the lots, and a processing completion event indicating that a lot has arrived at the temporary storage device from the processing device,
    updating storage state data indicating a lot storage state in the temporary storage devices based on the detected events; and
    determining whether the lots are in an under acceptance state indicating that a lot is waiting for the temporary storage devices at a transportation destination to become free, the under transportation state, or the awaiting transportation state based on the data indicating the event transition and the storage state data, and displaying the image showing whether the lots are in the under acceptance state, the under transportation state, or the awaiting transportation state.

* * * * *